United States Patent
Laroche et al.

(10) Patent No.: US 8,928,971 B2
(45) Date of Patent: Jan. 6, 2015

(54) HIGH-POWER OPTICAL FIBRE LASER

(75) Inventors: Mathieu Laroche, Cristot (FR); Herve Gilles, Bures sur Dives (FR); Sylvain Girard, Verson (FR); Thierry Robin, Camlez (FR); Benoit Cadier, Perros Guirec (FR)

(73) Assignees: IXFIBER, Lannion (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 13/985,183
(22) PCT Filed: Feb. 14, 2012
(86) PCT No.: PCT/FR2012/050319
§ 371 (c)(1),
(2), (4) Date: Sep. 19, 2013
(87) PCT Pub. No.: WO2012/110739
PCT Pub. Date: Aug. 23, 2012

(65) Prior Publication Data
US 2014/0016184 A1  Jan. 16, 2014

(30) Foreign Application Priority Data
Feb. 15, 2011 (FR) ...................................... 11 51237

(51) Int. Cl.
*G02F 1/35* (2006.01)
*H01S 3/067* (2006.01)
(Continued)

(52) U.S. Cl.
CPC ............ *G02F 1/353* (2013.01); *H01S 3/06754* (2013.01); *H01S 3/094042* (2013.01);
(Continued)

(58) Field of Classification Search
CPC .......... H01S 3/06754; H01S 3/094042; H01S 3/2308; G02F 1/353

USPC ................ 359/326–332, 341.3; 372/6, 70, 72
See application file for complete search history.

(56) References Cited

U.S. PATENT DOCUMENTS 5,818,630 A * 10/1998 Fermann et al. ......... 359/341.31
7,120,174 B2 * 10/2006 MacCormack et al. ........ 372/13
(Continued)

OTHER PUBLICATIONS

Minelly J D et al.: "High-Gain Fiber Power Amplifier Tandem-Pumped by a 3-W Multistripe Diode", Proceedings of the Optical Fiber Communication Conference, San Jose. Feb. 2-7, 1992; [Proceedings of the Optical Fiber Communication Conference], New York, IEEE,US. vol. 5, Feb. 2, 1992, pp. 32-33, XP000341534, ISBN: 978-1-55752-222-1 the whole document, Cited in ISR.

(Continued)

*Primary Examiner* — Daniel Petkovsek
(74) *Attorney, Agent, or Firm* — Young & Thompson

(57) ABSTRACT

A high-power optical fiber laser includes: an oscillator (1); a pumping laser (5) able to emit a high-power pumping optical radiation beam; and a signal-amplifying optical fiber (3) able to receive the optical source signal and the high-power pumping optical radiation beam so as to generate a high-power laser beam. The pumping laser includes a plurality of pumping multimode laser diodes (7a-7f) and a laser cavity, the laser cavity including a double-clad fiber (4) including: a neodymium-doped monomode waveguide; a fiber Bragg grating (9) forming one end of the laser cavity; and a fiber reflector (11) forming the other end of the laser cavity, the monomodefiber laser being able to generate a laser radiation beam when it is optically pumped by a pumping radiation beam originating from the plurality of pumping laser diodes in order for the laser cavity to emit a high-power pumping laser radiation beam.

11 Claims, 3 Drawing Sheets

(51) Int. Cl.
*H01S 3/094* (2006.01)
*H01S 3/23* (2006.01)
*H01S 3/00* (2006.01)
*H01S 3/16* (2006.01)

(52) U.S. Cl.
CPC ............. *H01S 3/2308* (2013.01); *H01S 3/0078* (2013.01); *H01S 3/0092* (2013.01); *H01S 3/0675* (2013.01); *H01S 3/094007* (2013.01); *H01S 3/094069* (2013.01); *H01S 3/1611* (2013.01); *H01S 3/1618* (2013.01); *H01S 2302/00* (2013.01); *H01S 2303/00* (2013.01)
USPC ............ 359/328; 359/326; 359/341.3; 372/6; 372/70; 372/72

(56) References Cited

U.S. PATENT DOCUMENTS

| | | | |
|---|---|---|---|
| 7,212,553 B2* | 5/2007 | Starodoumov et al. | 372/4 |
| 7,903,696 B2* | 3/2011 | Klebanov | 372/6 |
| 2003/0063629 A1 | 4/2003 | Davis et al. | |
| 2006/0280217 A1 | 12/2006 | Zervas et al. | |
| 2010/0135339 A1 | 6/2010 | Meleshkevich et al. | |

OTHER PUBLICATIONS

D. J. Richardson et al.: "High power fiber lasers: current status and future perspectives [Invited]", Journal of the Optical Society of America B, vol. 27, No. 11, Oct. 22, 2010, p. B63, XP055007201, ISSN: 0740-3224, DOI:10.1364/JOSAB.27.000B63 the whole document.

International Search Report, dated Jun. 6, 2012, from corresponding PCT application.

* cited by examiner

HIGH-POWER OPTICAL FIBRE LASER

RELATED APPLICATIONS

This application is a U.S. National stage (U.S. National Application Filed Under 35 U.S.C. 371) of international PCT/FR2012/050319 filed Feb. 14, 2013, which claims priority to French 1151237 filed Feb. 15, 2011.

BACKGROUND OF THE INVENTION

1. Field of the Invention

The present invention relates to a high-power optical fiber laser. More precisely, the invention relates to a fiber laser emitting at wavelengths in the blue band of the visible spectrum. The fiber laser allows generating a continuous or pulsed radiation in the nanosecond regime.

2. Description of the Related Art

Since its invention fifty years ago, the laser has experienced extraordinary developments, allowing having today lasers providing higher and higher energies or powers, in wavelength domains covering all the optical spectrum, and with shorter and shorter pulse durations reaching the femtosecond domain. Another axis of development aims to increase the integration of the laser systems, in particular by using compact sources, pump laser diodes and/or optical fiber amplifying mediums.

The 980 nm single-mode laser diodes available on the market have not only powers lower than the Watt in the continuous regime, but they do not allow reaching high peak powers.

Ytterbium-doped fiber lasers have been proposed as 980 nm laser sources. However, the 980 nm emission requires a very high pump fluence, due to the Ytterbium population levels. The emission of a laser beam of a power of 3.5 W has been demonstrated with a microstructured fiber having an air-clad and an Ytterbium-doped-guide to ensure the pump fluence level (K. H. Ylä-Jarkko et al., Advanced Solid-State Photonics, Vol. 83, OSA Trends in Optics and Photonics, 2003, paper 103). More recently, photonic fiber lasers have been developed, which comprise an Ytterbium-doped rod having a low ratio between core diameter and clad diameter, which allow obtaining a continuous 980 nm high-power (94 W) laser beam (J. Boullet et al., Opt. Express 16, 17891, 2008 and F. Roeser et al. Opt. Express 16, 17310, 2008). Nanosecond pulses of about 1 mJ have also been obtained with such photonic fibers. However, the use of photonic fibers poses manufacturing difficulties and do not allow manufacturing a compact and fully fibered laser system.

It is presently searched to develop robust and compact high-power lasers, operating in continuous or pulsed regime. It is searched to develop fiber lasers emitting around 980 nm, as well as in the blue part of the visible spectrum at powers of the order of the Watt. Such lasers find applications in many domains such as fluorescence spectroscopy, flow cytometry, biotechnologies, metrology, LIDARs and in particular the use thereof in bathymetry.

The present invention has for object to remedy these drawbacks and relates more particularly to a high-power optical fiber laser comprising an oscillator adapted to emit a source optical signal to be amplified, a pump laser adapted to emit a high-power pump optical radiation, a signal-amplifying optical fiber, adapted to receive said source optical signal and said high-power pump optical radiation. According to the invention, said pump laser comprises a plurality of multimode pump laser diodes and a laser cavity, said laser cavity comprising a double-clad fiber including a Neodymium-doped single-mode guide, an optical fiber Bragg grating forming an end of said laser cavity and a fiber reflector forming the other end of said laser cavity, said single-mode laser fiber being adapted to generate a laser radiation when it is optically pumped by a pump radiation coming from the plurality of pump laser diodes so that said laser cavity emits a high-power pump laser radiation, and said signal-amplifying optical fiber comprises a rare-earth-doped single-mode optical fiber section, so as to generate a high-power laser beam, when said signal-amplifying optical fiber is optically pumped by said high-power pump optical radiation.

According to particular aspects of the invention:
said single-mode optical fiber section of said signal-amplifying optical fiber comprises an Ytterbium-doped guide;
said signal-amplifying optical fiber has a high ion-doping rate so that the length of said single-mode optical fiber section of said signal-amplifying optical fiber is lower than a few tens of centimeters.

According to a particular embodiment, the fiber laser comprises an optical frequency converter, said converter being adapted to receive said high-power laser beam coming from said signal-amplifying optical fiber in a wavelength band and to frequency-convert said high-power laser beam so as to generate said high-power laser beam in another wavelength band.

According to a particular aspect of this embodiment, said fiber laser further comprises an optical filtering means arranged between an output end of said signal-amplifying optical fiber and an input of said optical frequency converter, said optical filtering means being adapted to separate an optical radiation at the high-power pump wavelength from an optical radiation at the wavelength of said amplified optical signal.

According to other particular aspects of the invention, said fiber laser comprises:
an optical pump coupling means adapted to receive the pump laser radiations coming from said pump laser diodes and to couple said pump laser radiations to said pump-amplifying optical fiber;
optical coupling means adapted to couple the source optical signal to be amplified and said high-power pump optical radiation, respectively, in said signal-amplifying optical fiber;
said pump laser fiber is rare-earth-doped;
said pump laser fiber is a double-clad fiber having a leaky-mode refractive index profile and a rare-earth-doped core;
said oscillator comprises a fibered laser diode coupled to a pulse generator so as to generate high-power laser pulses.

BRIEF SUMMARY OF THE INVENTION

The present invention also relates to the characteristics that will become evident from the following description and that will have to be considered either alone or in any technically possible combination thereof.

BRIEF DESCRIPTION OF THE DRAWINGS

This description, which is given by way of non-limitative example, will allow a better understanding of how the invention can be implemented, with reference to the appended drawings in which.

DETAILED DESCRIPTION OF THE PREFERRED EMBODIMENTS

The laser is based on an original pumping and amplification scheme, which is described in detail with reference to FIG. 1.

Figure 1:
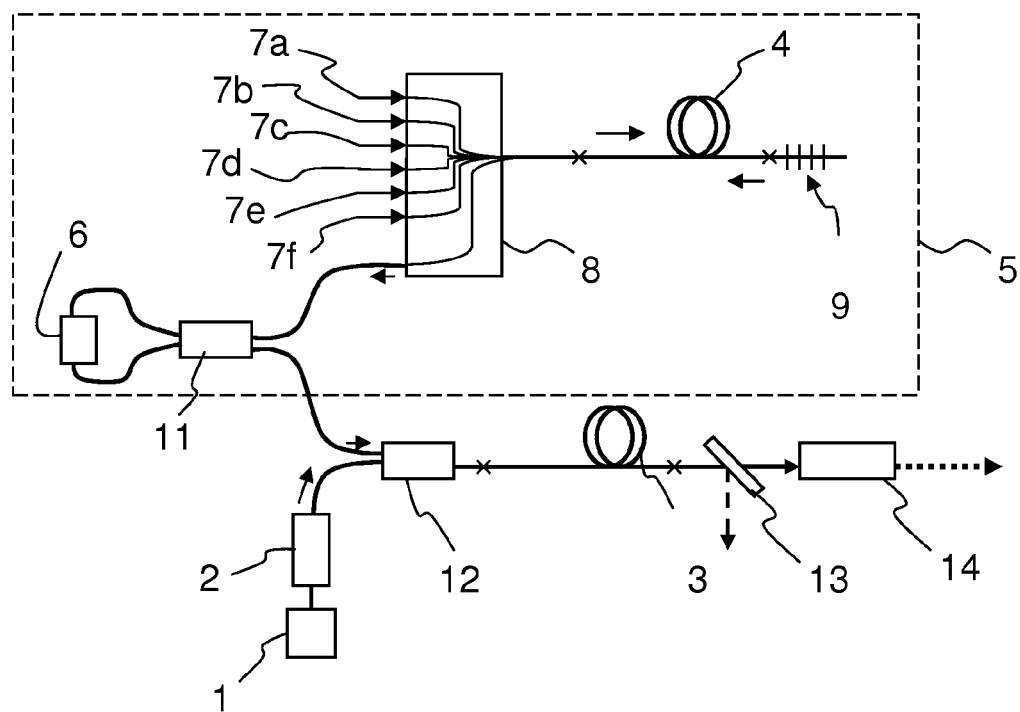
FIG. 1 schematically shows a fiber laser of the MOPA type according to an embodiment of the invention.
Figure 2:
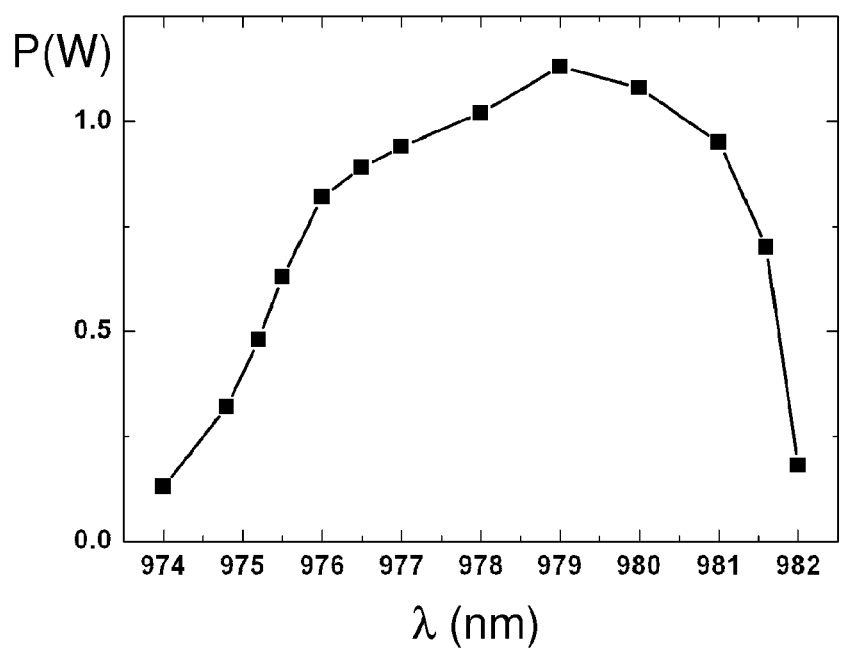
FIG. 2 shows the wavelength tuning about 978 nm of the system in continuous regime.

FIG. 1 schematically shows a fiber laser of the MOPA (Master Oscillator Power Amplifier) type. The laser comprises a master oscillator (1), which is a fibered laser diode emitting at the wavelength of about 978 nm, either in continuous regime or in pulsed regime. The master oscillator (1) is either piloted by a source of current or gain-switched by a pulse generator. This oscillator (1) comprises a narrow-spectrum narrowed gain-switched Fabry-Perot laser diode (or spectrally narrowed gain-switched FP laser diode), coupled to a diffraction grating in an external cavity. In pulsed mode, this oscillator (1) allows generating pulses with a duration of about 10 nanoseconds, a mean power of 1.5 mW at a repetition frequency of 1.5 MHz and a spectral width lower than 0.05 nm (limit of resolution of the optical spectrum analyzer). An optical isolator (2) placed in front of the oscillator (1) allows protecting the oscillator (1) from the return amplified laser pulses.

A pump source (5) is coupled to a signal-amplifying fiber (3). It is chosen to pump the signal-amplifying fiber (3) at a wavelength of about 930 nm. The pump source (5) comprises an pump-amplifying optical fiber (4). The pump-amplifying fiber (4) is preferably a rare-earth-doped fiber. In the embodiment shown in FIG. 1, the pump-amplifying fiber (4) is a Neodymium-doped double-clad fiber. The pump-amplifying fiber (4) is a double-clad fiber (or DCF), having a leaky-mode refractive index profile. The core of the pump-amplifying fiber (4) is single-mode, with a core diameter of about 5 micrometers, and a numerical aperture (NA) of about 0.14. The pump source (5) comprises at least one pump laser diode adapted to pump the pump-amplifying fiber (4). In the example of FIG. 1, the pump source (5) comprises six pump laser diodes (7a, 7b, 7c, 7d, 7e, 7f) emitting a pump signal at 808 nm. Each multimode diode (7a, 7b, 7c, 7d, 7e, 7f) has a power of about a few Watts, for a total pump power equal to 12 W. The pump signals coming from the pump laser diodes (7a, 7b, 7c, 7d, 7e, 7f) are combined by means of a directional coupler (8) that allows combining pump signals with an amplified signal. The pump signals of the pump laser diodes (7a, 7b, 7c, 7d, 7e, 7f) are thus injected into the multimode clad of the double-clad amplifying fiber (3). The laser cavity is formed at one end by an optical fiber Bragg grating (9), or FBG, and at the other end by fiber mirror based on a fiber coupler 98:2 (11) and a polarization controller (6) so as to provide an fine adjustment of the reflection coefficient; however, this system may be advantageously replaced by a low-reflectivity Bragg grating. The FBG is merged with one end of the pump-amplifying fiber (3). The FBG filters and reflects the pump signal amplified at 930 nm. The pump-amplifying fiber (4) is advantageously a Neodymium-doped core fiber having a length of 25 m, a clad diameter of 125 μm, a core diameter of 5 μm and a numerical aperture of 0.11. A pump and pump signal directional coupler (8) lets the amplified pump signal pass into the laser cavity. We have thus a fully fibered pump source (5) adapted to emit a high-power 930 nm pump signal. In an exemplary embodiment, with a total pump power of 12 W at 808 nm, a 930 nm continuous pump signal having a power of 2.7 W is obtained at the output of the multiplexer coupler (11).

The signal-amplifying fiber (3) is preferably a rare-earth-doped fiber. In the embodiment shown in FIG. 1, the signal-amplifying fiber (3) is a strongly-Ytterbium-doped single-mode-core fiber. The length of the signal-amplifying fiber (3) is critical to avoid an emission about 1080 nm and to obtain a strong efficiency of amplification in the vicinity of 978 nm. In an exemplary embodiment, the optimal length of the signal-amplifying Ytterbium fiber (3) is of 19 cm±0.5 cm. This short length of signal-amplifying fiber (3) allows avoiding the appearance of undesirable non-linear effects. This configuration allows maintaining the spectral quality of the signal that is necessary for an efficient frequency conversion.

First will be illustrated the laser operation in continuous regime, then its operation in pulsed regime.

Figure 3:
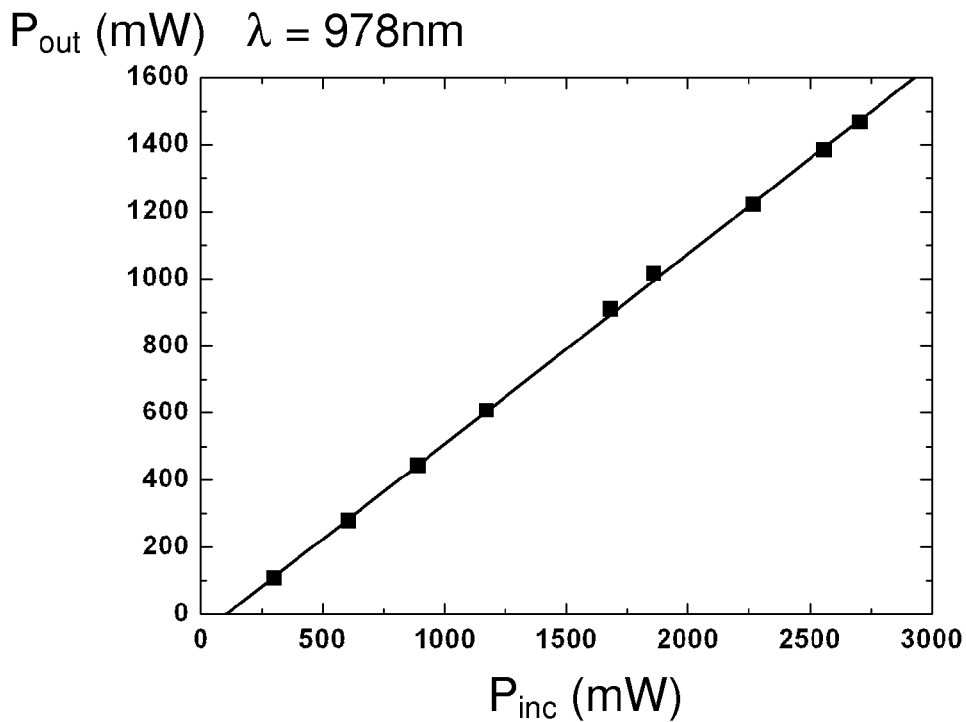
FIG. 3 shows an output power curve at 978 nm as a function of the pump power in pulsed regime.

FIG. 3 shows a gain curve of the signal-amplifying fiber (3) representing the output power as a function of the pump power about 978 nm in continuous regime. In continuous regime, an efficiency of 81.4% with respect to the incident pump power at 930 nm is obtained. The wavelength tuning of the laser is observed at about 980 nm, the spectral bandwidth being of about 6 nm. A maximal power of 2.1 W is obtained at 978 nm with a diffraction-limited beam. The pump threshold power is of 0.12 W. A fiber multiplexer coupler (12) allows combining the pump and the signal to be amplified so as to couple them directly in the core of the amplifying fiber (3).

According to a preferred variant, a second harmonic generator (SHG) (14) is used at the output of the signal-amplifying fiber (3) so as to produce a laser signal in the blue part of the visible spectrum. A dichroic filter (13) is placed at the output of the signal-amplifying fiber (3) so as to separate the 930 nm pump signal from the 978 nm amplified signal. The second harmonic generator (14), also called a frequency doubler, thus allows obtaining a 489 nm continuous laser signal. According to an exemplary embodiment, the second harmonic generator (14) is a MgO-doped PPLN crystal having a length of 10 mm, from the Covesion company. The spectral width of the 489 nm output laser signal is lower than 0.05 nm, which is the limit of resolution of the optical spectrum analyzer used.

Figure 4:
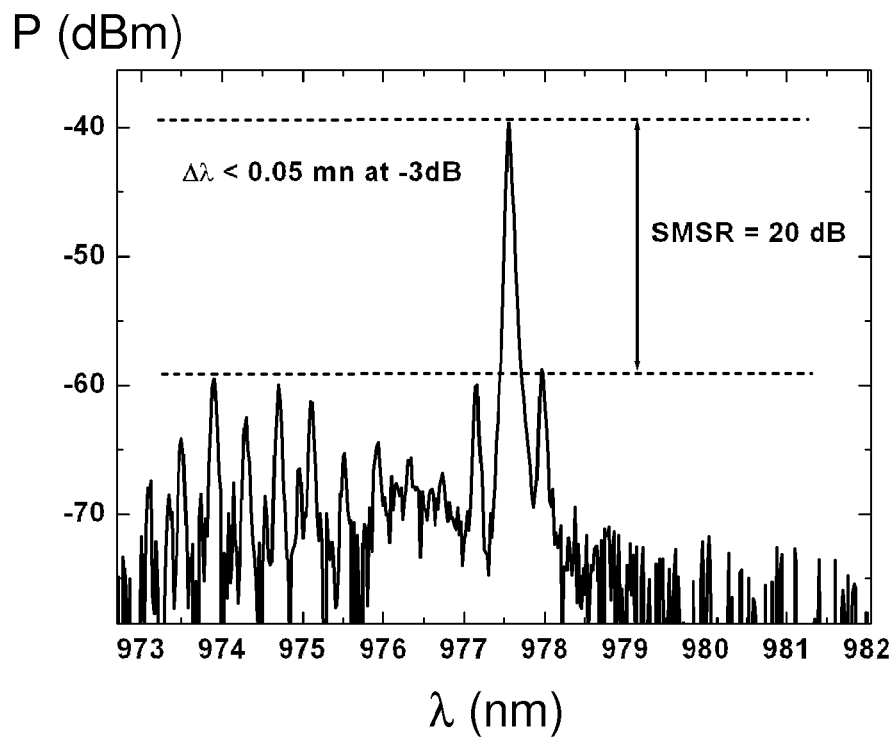
FIG. 4 shows the wavelength spectrum of the laser signal about 978 nm at the output of the amplifier.

In a nanosecond pulsed regime, a gain switch is used for operating the source laser diode. FIG. 4 shows an amplification curve as a function of the 978 nm wavelength. An efficiency of 58% (power emitted at 978 nm with respect to the incident power) is observed, which is lower than the efficiency obtained in continuous regime, due to the low power of the input laser pulses (about 0.5 W). The optimum repetition frequency to generate a high peak power is of 1.2 MHz. The amplification gain is of 35 dB. The output peak power is of 120 W. 89% of the output signal thus remains in the main peak, whose spectral width is lower than 0.05 nm.

Figure 5:
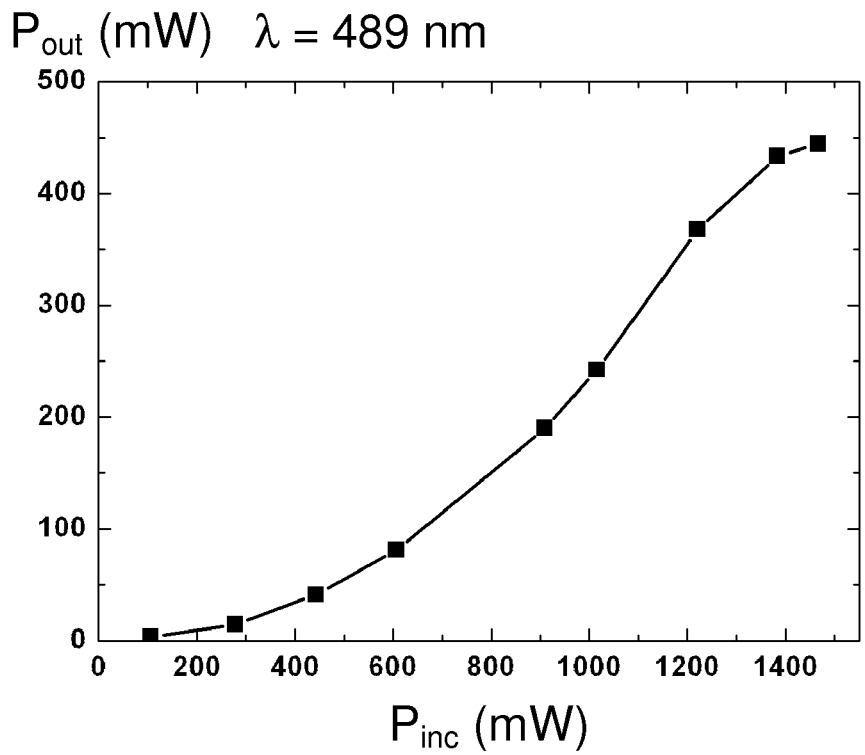
FIG. 5 shows an output power curve at 489 nm as a function of the pump power in pulsed regime.
Figure 6:
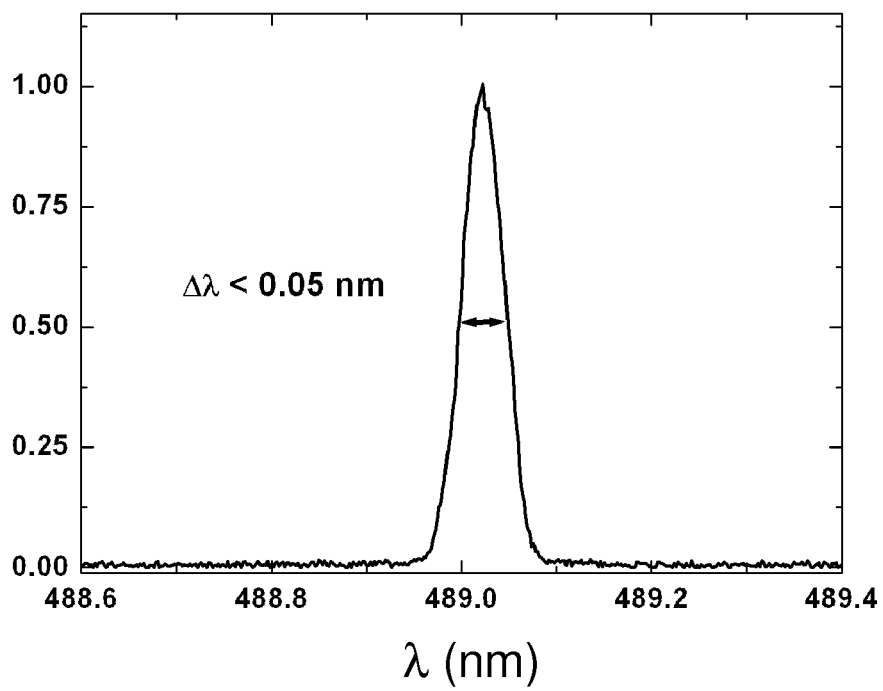
FIG. 6 shows a laser pulse emission intensity curve as a function of the wavelength in the blue part of the visible spectrum.

It is also possible to use the dichroic filter (13) and the second harmonic generator (14) in pulsed regime, to generate 489 nm laser pulses, according to the scheme of FIG. 1. FIG. 5 shows a 489 nm output power curve as a function of the pump power in pulsed regime. In an exemplary embodiment, the conversion efficiency of the second harmonic generator (14) is of 30.5% in pulsed regime. However, this conversion efficiency is presently limited by the thermal effects occurring in the PPLN non-linear crystal. FIG. 6 shows an emission intensity curve of an amplified laser pulse as a function of the wavelength in the blue part of the spectrum, about 489 nm. A high spectral purity of the laser pulse amplified and frequency-doubled at 489 nm, as well as a high spatial quality, are observed. 489 nm laser pulses are thus obtained, having a power of 0.45 W in nanosecond regime.

The optimization of the parameters of the signal-amplifying fiber (3) may allow optimizing the amplification gain at 980 nm. On the other hand, the optimization of the source laser pulses may allow obtaining a better saturation of the MOPA laser.

The invention allows producing a fully fibered MOPA source using an Ytterbium-doped amplifying fiber emitting at 980 nm, pumped by a Neodymium-doped fiber laser having a leaky-mode refractive index profile emitting at the wavelength of 930 nm, itself optically pumped by fibered diodes emitting at 806 nm. For example, the profile of the fiber may be of the W-shaped type. The MOPA system emits in continuous or in pulsed regime and the 980 nm emission may by efficiently frequency-doubled to obtain a 490 nm emission. The invention will find a particularly advantageous application in the continuous or pulsed fiber lasers emitting in the visible spectrum, and in particular in the blue part of the visible spectrum.

The invention proposes a fully fibered laser of the MOPA (Master Oscillator Power Amplifier) type, based on single-mode fibers. The laser provides laser pulses having a power of 2.1 W at 978 nm. The small length of the signal-amplifying fiber allows avoiding or limiting the appearance of undesirable non-linear effects and to maintain the spectral and spatial quality of the beam required to obtain a high efficiency of frequency conversion, in a PLLN crystal for example. Hence, laser pulses are for example obtained, which have a power of 0.45 W at 489 nm.

The invention claimed is:

1. A high-power optical fiber laser comprising:
   an oscillator that emits a source optical signal to be amplified;
   a pump laser that emits a high-power pump optical radiation; and
   a signal-amplifying optical fiber operatively connected to receive said source optical signal and said high-power pump optical radiation, wherein,
   said pump laser comprises a plurality of multimode pump laser diodes and a laser cavity, said laser cavity consisting essentially of a double-clad fiber including a Neodymium-doped single-mode guide, an optical fiber Bragg grating forming a first end of said laser cavity and a fiber reflector forming an opposite, second end of said laser cavity, said single-mode laser fiber being optically pumped by a pump radiation at a wavelength of 806 nm coming from the plurality of pump laser diodes, said pump radiation being injected into the multimode clad of said double-clad amplifying fiber, and said optical fiber Bragg grating filtering and reflecting a pump signal amplified at a wavelength of 930 nm, so that said laser cavity emits a high-power pump laser radiation at the wavelength of 930 nm, and
   said signal-amplifying optical fiber comprises a Ytterbium-doped single-mode optical fiber section, said signal-amplifying optical fiber being optically pumped by said high-power pump optical radiation at the wavelength of 930 nm so as to amplify said source optical signal to generate a high-power laser beam at about 978 nm.

2. The fiber laser according to claim 1, wherein said signal-amplifying optical fiber has a high ion-doping rate so that the length of said single-mode optical fiber section of said signal-amplifying optical fiber is lower than a few tens of centimeters.

3. The fiber laser according to claim 2, further comprising an optical frequency converter, said converter being a second harmonic generator that receives said high-power laser beam coming from said signal-amplifying optical fiber in a wavelength band at about 978 nm and frequency-converts said high-power laser beam so as to generate said high-power laser beam in another wavelength band at 489 nm.

4. The fiber laser according to claim 2, further comprising an optical pump coupling means that receives the pump laser radiations coming from said pump laser diodes and couples said pump laser radiations to said pump amplifying optical fiber.

5. The fiber laser according to claim 1, further comprising an optical frequency converter, said converter being a second harmonic generator that receives said high-power laser beam coming from said signal-amplifying optical fiber in a wavelength band at about 978 nm and frequency-converts said high-power laser beam so as to generate said high-power laser beam in another wavelength band at 489 nm.

6. The fiber laser according to claim 5, further comprising an optical filtering means arranged between an output end of said signal-amplifying optical fiber and an input of said optical frequency converter, said optical filtering means separating an optical radiation at the high-power pump wavelength from an optical radiation at the wavelength of said amplified optical signal.

7. The fiber laser according to claim 5, further comprising optical coupling means that couples said source optical signal to be amplified and said high-power pump optical radiation, respectively, in said signal-amplifying optical fiber, said optical coupling means comprising a fiber multiplexer coupler suitable that combines the pump radiation at the wavelength of 930 nm and the signal to be amplified at about 978 nm so directly in the core of the amplifying fiber.

8. The fiber laser according to claim 1, further comprising an optical pump coupling means that receives the pump laser radiations coming from said pump laser diodes and couples said pump laser radiations to said pump amplifying optical fiber.

9. The fiber laser according to claim 1, further comprising optical coupling means that couples said source optical signal to be amplified and said high-power pump optical radiation, respectively, in said signal-amplifying optical fiber, said optical coupling means comprising a fiber multiplexer coupler suitable that combines the pump radiation at the wavelength of 930 nm and the signal to be amplified at about 978 nm so as to couple them directly in the core of the amplifying fiber.

10. The fiber laser according to claim 1, wherein said pump laser comprises a pump-amplifying optical fiber which is a double-clad fiber having a leaky-mode refractive index profile and a rare-earth-doped core.

11. The fiber laser according to claim 1, wherein said oscillator comprises a fibered laser diode coupled to a pulse generator and said fiber laser is adapted to generate high-power laser pulses.

* * * * *